Jan. 12, 1932.  F. TWYMAN  1,840,476
MONOCHROMATOR
Filed March 20, 1929
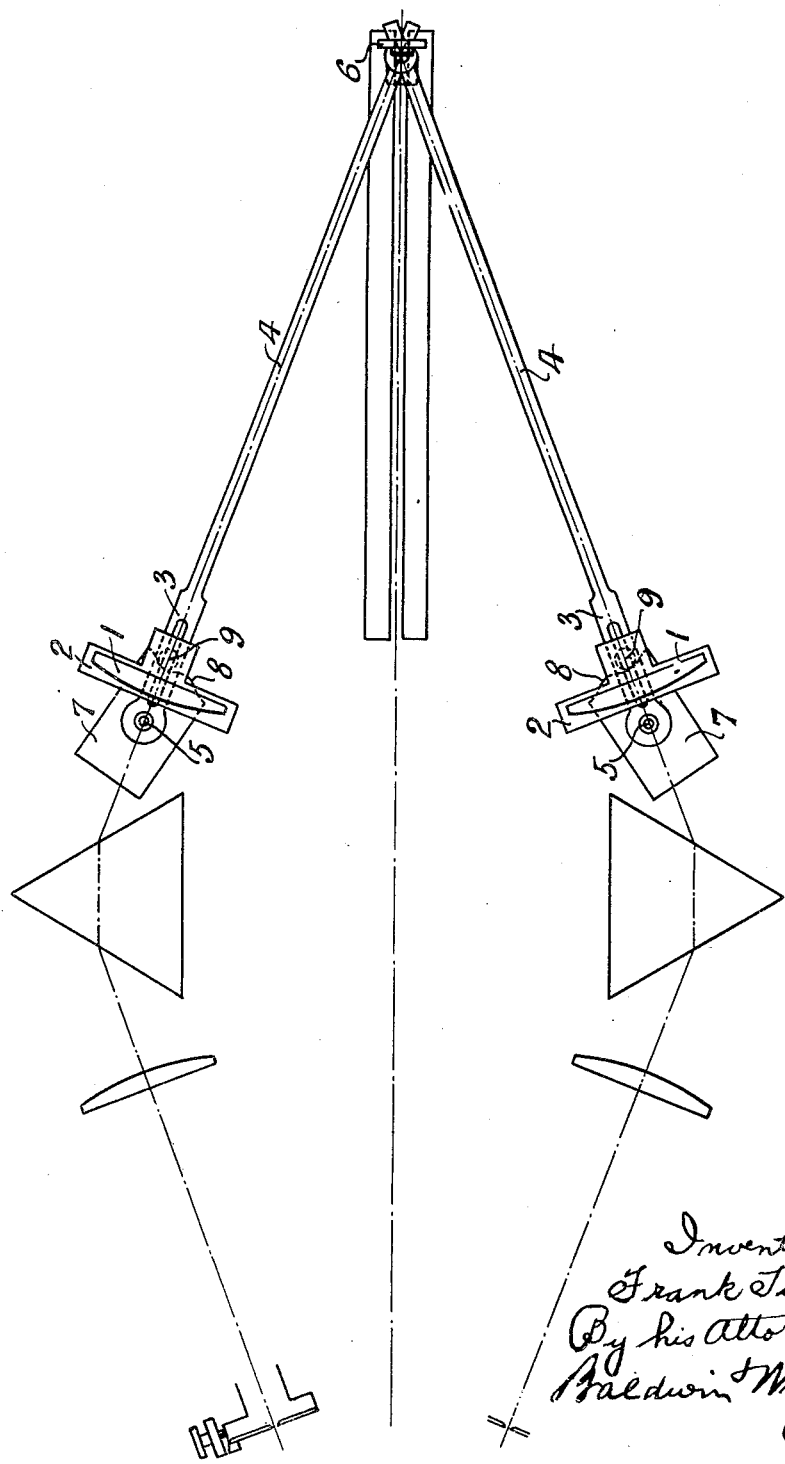
Inventor
Frank Twyman
By his Attorneys,
Baldwin & Wight Patented Jan. 12, 1932

1,840,476

UNITED STATES PATENT OFFICE

FRANK TWYMAN, OF LONDON, ENGLAND, ASSIGNOR TO ADAM HILGER, LIMITED, OF LONDON, ENGLAND

MONOCHROMATOR

Application filed March 20, 1929, Serial No. 348,644, and in Great Britain April 2, 1928.

This invention relates to an improved spectroscopic monochromatic illuminator.

The method employed for dispersing the light incorporates the well-known method of increasing spectral purity by employing means of isolating a given spectral region before its passage into the final dispersing system. For example, in the instrument described by van Cittert in "Revue d'Optique", 2, p. 57, the light entering the monochromator is previously dispersed by a spectroscope rigidly connected with it, while in an instrument with achromatic lenses designed for the visual spectrum by Frederick Bates of the Bureau of Standards, Washington, a portion of the spectrum was isolated by a narrow mirror placed in the image of the spectrum, and was thereafter submitted to a further spectroscopic dispersion.

One object of the invention is to provide an improved spectroscopic monochromatic illuminator which overcomes the disadvantages of the necessity for chromatic adjustment, and of diffusion, characteristic of most existing instruments of this class. Other objects will become apparent from the following description.

The present invention is appropriate not only for the visual spectrum, but for the infra red and ultra violet. The lenses are not achromatic but like the prism can be made of any transparent materials selected for their transmission of the rays which it is desired to isolate.

In the apparatus of this invention the preliminary filtration is effected by a first dispersing system identical with the final dispersing system, both being disposed symmetrically with respect to a narrow adjustable mirror situated in the focal plane common to the imaging lens of the first system and the collimating lens of the second system. Thus each half of the instrument is the mirror image of the other, the line of symmetry between the two halves being the focal plane of the first half. The narrow mirror whose plane is perpendicular to the line of symmetry serves to redirect the light of a restricted region of the spectrum formed by the first system and to cause it to pass into the second system. The mirror is adjustably mounted by relation to the prism system so as to move in a straight line along the line of symmetry between the two halves of the instrument. By this arrangement the image focussed on the emergence slit is in constant sharp focus for any wavelength.

The invention is illustrated by way of example in the accompanying diagrammatic drawing in which the same reference numerals are used to denote like parts of the two dispersing systems. Each rotating lens 1 is mounted on a carriage 2 which is adjustable longitudinally in the direction of the lens axis along a slide 3 forming part of a radial bar 4 which latter is rotatable about a fixed centre 5 and passes through a rotatable slide attached to the mirror mount 6. The sliding lens carriage is adjusted automatically along the slide 3 by means of a template 7, fixed to the base of the instrument, having a curved surface 8 against which a roller abutment 9 which is free to rotate about a centre fixed to the lens carriage, bears and causes the lens carriage to take up a position such that for any position of the mirror the light proceeding along the axis of the first imaging lens is accurately focussed upon the mirror.

The prism and the lens remote from the mirror on both sides of the apparatus have automatic adjustment in the known way whereby accurate minimum deviation adjustment or an adjustment related in a definite way to the minimum deviation position is mechanically secured.

It will be observed that the imaging lens of the first system and the collimating lens of the second system are mechanically connected with the adjustable mirror in such a way that their axes pass through the centre of the mirror in every position of the latter, the lenses being free to take up corresponding positions automatically by rotation. The mechanical rotation of these lenses is so designed as to cause the locus of the axial foci to be practically coincident with the centre of the mirror, this condition being complied with by the application of a simple constraint acting independently or in conjunction with the rotation and controlling the motion of the lenses.

The instrument is permanently in focus and is suitable for use over the whole spectrum range for which optical materials are available, the prism being maintained permanently in a position of approximate minimum deviation.

The adjustable mirror can be moved (by a micrometer screw, or by a rackwork), and since each position corresponds with a particular refractive index of prisms and lenses the movement of the mirror can be utilized to calibrate the instrument to read in refractive indices; or if desired in wavelengths or in frequencies for the radiation which emerges through the second slit.

The astigmatism that is caused by the prism on account of the great range of dispersion can be corrected mechanically by an appropriate small rotation of the prism which is in effect superimposed upon the rotation adjustment for minimum deviation.

In order to secure the maximum of light transmission the reflecting mirror may be suitably curved in order to avoid vignetting at the second collimator.

The loss of purity due to curvature of image at the final slit may be approximately compensated by suitable curvature of the entrance slit.

What I claim is:—

1. A spectroscopic monochromator comprising a narrow mirror, a movable mount therefor, an imaging lens, a movable mount for said imaging lens, a collimating lens, a movable mount for said collimating lens, pivoted radial bars interconnecting the said mirror mount with the said lens mounts respectively, slides for carrying said lens mounts, on said bars, abutments on said slides, and cam surfaces of varying curvature in engagement with said abutments.

2. A spectroscopic monochromator comprising a narrow mirror, a movable mount therefor, an imaging lens, a movable mount for said imaging lens, a collimating lens, a movable mount for said collimating lens, pivoted radial bars interconnecting the said mirror mount with the said lens mounts respectively, slides for carrying said lens mounts on said bars and means for moving said lens mounts along said bars as the latter are moved about their pivots.

In testimony that I claim the foregoing as my invention, I have signed my name this 8th day of March, 1929.

FRANK TWYMAN.